No. 866,354. PATENTED SEPT. 17, 1907.
A. M. GILL.
FAT BACK SKINNING MACHINE.
APPLICATION FILED DEC. 14, 1906.

Witnesses:
Wm. Geiger

Inventor:
Austin M. Gill
By Munday, Evarts, Adcock & Clark,
Attorneys

UNITED STATES PATENT OFFICE.

AUSTIN M. GILL, OF CHICAGO, ILLINOIS.

FAT-BACK-SKINNING MACHINE.

No. 866,354.  Specification of Letters Patent.  Patented Sept. 17, 1907.

Application filed December 14, 1906. Serial No. 347,743.

*To all whom it may concern:*

Be it known that I, AUSTIN M. GILL a citizen of the United States, residing in Chicago, in the county of Cook and State of Illinois, have invented a new and useful Improvement in Fat-Back-Skinning Machines, of which the following is a specification.

This invention relates to machines for skinning the fat backs, as they are commonly called, of hogs.

Figure 1:
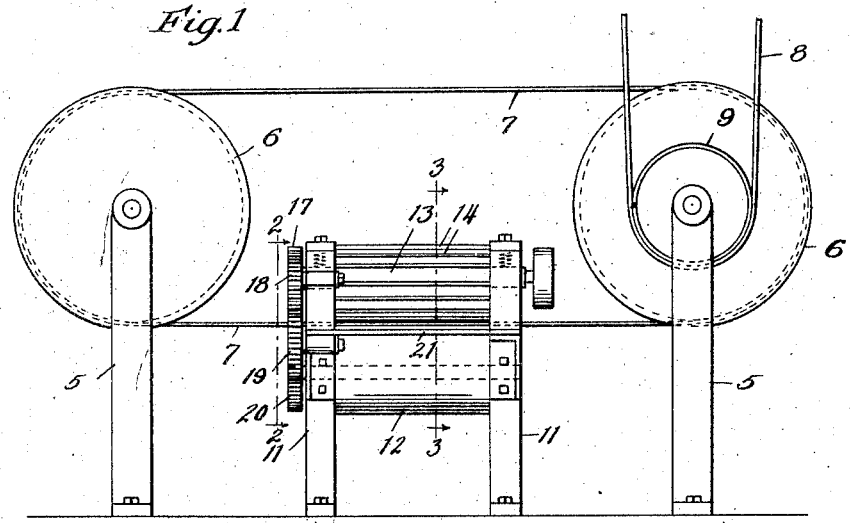
Figure 2:
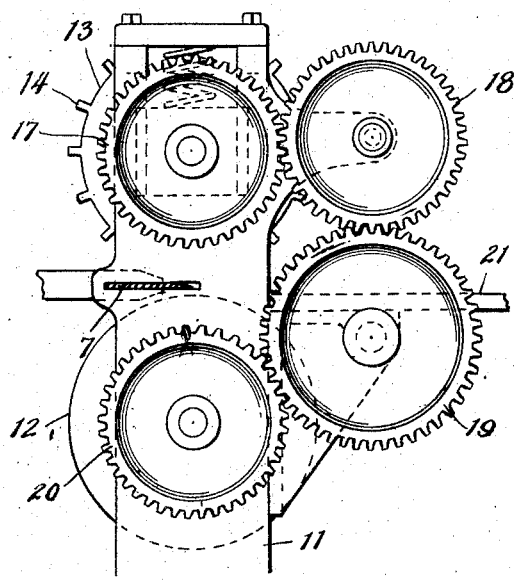
Figure 3:
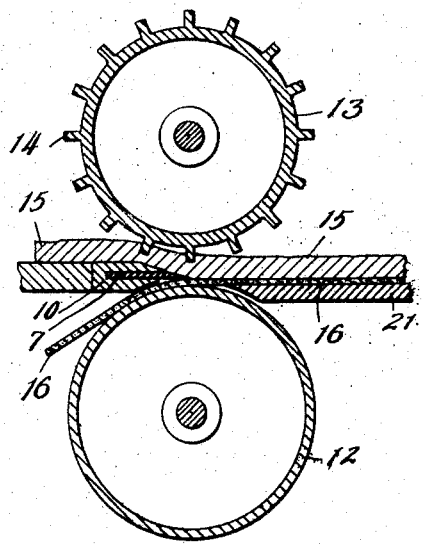

The main feature of the invention is found in the means employed for feeding the fat backs to the knife, whereby the skin is separated therefrom, and the nature of the improvement is fully disclosed in the accompanying drawing in which Figure 1 is a front elevation of the machine. Fig. 2 is a transverse vertical section on the line 2—2 of Fig. 1. and Fig. 3 is a partial transverse section on the line 3—3 of Fig. 1.

In said drawing, 5, 5 are standards in which are journaled the knife carrying wheels 6, 6. The knife is in the form of a flexible endless band 7 passing around the wheels 6 and operated thereby horizontally and continuously in one direction, one of said wheels being driven by a belt 8 and pulley 9. The knife is sharp at one edge and the opposite edge moves through a stationary guide 10, plainly seen at Figs. 2 and 3. Between the standards 5 are other standards 11 in which are journaled a supporting roller 12 and a feeding roller 13. These rollers are both arranged so that their axes are parallel to the line of motion of the knife, and they are adapted to feed the fat back across the knife. The roller 12 is furnished with unyielding bearings, and it may be and preferably is smooth surfaced. The feeding roller is provided with bearings adapted to yield upwardly so that the roller may rise and fall in accordance with the thickness of the fat back which may be passing between the rollers. The upper roller also carries a series of longitudinal ribs 14 arranged around its surface at equal distances apart and preferably angular in shape. These ribs are adapted to press their way into the fat side of the fat back, and by reason thereof to force the fat back along in its course across the knife so that the knife may then separate the fat 15 from the skin 16, as plainly illustrated at Fig. 3. The rollers 12 and 13 are driven continuously from any suitable source of power by the series of gears 17, 18, 19 and 20, such gearing being adapted to accommodate itself to the rising and falling movement of roller 13. A table 21 supports the fat back until it is entered between and is engaged by the rollers.

The construction shown is very simple and is one which insures uniform thickness to the skin and avoids all danger of damage to the skin by the knife.

I am aware that it has been proposed to sever the fat from hog backs by employing a stationary knife, in combination with feeding rolls acting both on the top and on the bottom of the backs. I am convinced by my own use of a stationary knife that it is not adapted to be used in a machine of the kind shown by me. In fact, it is wholly impractical. The meat banks up in front of a stationary knife until the pressure from the feeding devices becomes very great and sufficient to overcome the resistance. And while it is thus banking up, the meat accumulates unevenly, sometimes above and sometimes below the knife so that when it is finally forced past the knife the cut which takes place may be above or below the proper plane or partly above and partly below. The resulting product has much fat on the skins which ought to be removed, and the skins are often cut. With a stationary knife also the feeding devices must be such as will take a strong hold of the skin side of the meat, and they can only do this by hooking or sticking sharp points into the skins. All the skins are injured in this way more or less, and their value seriously lessened. The stationary knife machine requires much more power than the machine shown by me.

I claim:—

1. The combination in a fat back skinning machine, of a traveling band knife moving horizontally and continuously in one direction and rollers for feeding the fat back across such knife, one of said rollers upon the skin side being unyielding, and the roller upon the fat side being yielding and having longitudinal feeding ridges or projections.

2. The combination in a fat back skinning machine, of a traveling band knife moving horizontally and continuously in one direction, and rollers for feeding the fat back across such knife, one of said rollers being made yielding, and armed with longitudinal ridges or projections for feeding purposes.

3. The combination in a fat back skinning machine, of a traveling band knife moving continuously in one direction, a guide for supporting said knife at the point of cutting, and means for feeding the fat back across said knife, such feeding means having ridges, projections or teeth engaging the fat back upon the fat side.

AUSTIN M. GILL.

Witnesses:
H. M. MUNDAY,
WILLIAM A. GEIGER.